United States Patent [19]
Yoshida

[11] Patent Number: 4,818,030
[45] Date of Patent: Apr. 4, 1989

[54] AUTOMOTIVE WHEEL
[75] Inventor: Takao Yoshida, Kawaguchi, Japan
[73] Assignee: Honda Giken Kogyo Kabushiki Kaisha, Tokyo, Japan
[21] Appl. No.: 890,067
[22] Filed: Jul. 24, 1986
[30] Foreign Application Priority Data
Jul. 26, 1986 [JP] Japan .............................. 61-114964[U]
[51] Int. Cl.$^4$ ............................................... B60B 1/00
[52] U.S. Cl. ............................ 301/5 VH; 301/6 WB; 301/37 R
[58] Field of Search ............... 301/5 R, 5 VH, 6 WB, 301/37 R, 37 T, 13 SM, 36 R, 63 R, 65, 6 CS; 152/427

[56]                References Cited
U.S. PATENT DOCUMENTS

| 1,645,921 | 10/1927 | Moore | 301/5 VH X |
| 1,969,193 | 8/1934 | Woodward | 301/36 R X |
| 2,048,442 | 7/1936 | Frank | 301/65 X |
| 2,197,608 | 4/1940 | Burger | 301/36 R X |
| 2,580,343 | 12/1951 | Benoit | 301/5 VH X |
| 2,631,065 | 3/1953 | Borodie | 301/5 VH |
| 2,717,059 | 9/1955 | Lyon | 301/6 CS |
| 3,043,630 | 7/1962 | Heitzman | 301/6 CS |
| 4,453,776 | 6/1984 | Rohr | 301/5 VH |

FOREIGN PATENT DOCUMENTS

| 809224 | 2/1937 | France | 301/5 VH |
| 224342 | 12/1925 | United Kingdom | 301/36 R |
| 277654 | 1/1928 | United Kingdom | 301/5 VH |

Primary Examiner—Robert B. Reeves
Assistant Examiner—Russell D. Stormer
Attorney, Agent, or Firm—Lahive & Cockfield

[57]                ABSTRACT

A vehicle wheel is made by forming a protective projection integrally with the bottom wall of a rim. This projection is located adjacent to opposite sides of the wheels filling valve, as viewed in the circumferential direction. This filling valve is fitted to the rim bottom wall and extends in a bent shape or "L" toward a side of the wheel.

1 Claim, 3 Drawing Sheets

AUTOMOTIVE WHEEL

GENERAL BACKGROUND OF INVENTION

This invention relates to automotive wheels and paricularly to wheels to be fitted to small vehicles, such as motorcycles and tricycles.

When a filling valve of a bent shape (L shape), extending generally toward an outer side of a wheel is fitted to the bottom wall of a rim to whose periphery a tire is fitted, it is desirable to provide means for supporting the filling valve by giving seat-like support. Such support will resist external forces acting thereon such as those encountered while filling the tire with air. This is because the L-shaped filling valve is longer, as compared to filling valves of other shapes.

The object of this invention is to provide means for supporting such a filling valve, thereby effectively reducing the influence of external force acting on the filling valve.

This object is accomplished by forming integrally with the bottom wall of a wheel rim a protective projection. This projection is fitted to the rim bottom wall and located adjacent to both sides of the valve, in the peripheral or circumferential direction of the filling valve, where such a valve extends in a bent shape toward a side of the wheel.

Specifically, the invention herein presented contemplates individually significant aspects as follows.

The first aspect relates to an automotive wheel comprising:
 wheel rim means having bottom wall means;
 a filling valve; and
 a protection projecting means formed integrally with bottom wall means of the rim means;
 the protective projection means being located adjacent to opposite sides, in the circumferential direction, of the filling valve; and
 the filling valve being fitted to the rim bottom wall means and extending generally radially inwardly and then generally laterally of said bottom wall means.

A related further aspect of the foregoing concept entails an automotive wheel wherein the protective projection means comprises:
 tab-like flange means projecting in a cantilever manner from the rim means.

Additionally, such an automotive wheel as defined above may further comprise projection means including
 bifurcated extremity means defining a concave support seat
 transversely receiving a portion of the filling valve;
 the seat being disposed circumferentially between a pair of circumferentially spaced, wheel exhausted ports; and the seat defining a filling location for the wheel relative to the wheel and cover means thereof.

In describing the invention by way of example, but not by way of limitation, reference will be made to a presently preferred embodiment shown in the appended drawings.

DRAWINGS OF PREFERRED EMBODIMENT

In describing the preferred embodiment as depicted in the appended drawings, it may be useful, at this juncture, to be provided with an identification of certain structural elements as follows:

10—bottom case
11—projected piece
12—axle
14—front wheel
16—hub
18—spoke section
19—projection
20—rim
20A—projection
20a—cavity
21—bottom wall
22—projection
24—filler valve
25—valve cap
30—first cover
32—air exhaust port
34—screw
40L, 40R—second covers
42—disk shaped main section
43—bulged section
44—air intake port
46—small air exhaust port
48—fork pipe cover
50—screw
52—supporting piece
53,54,56,58—screws
C—caliper
D—rotating disk
T—tire

DETAILED DESCRIPTION

By referring to FIGS. 1 to 5, an embodiment of the present invention will now be described.

Figure 1:
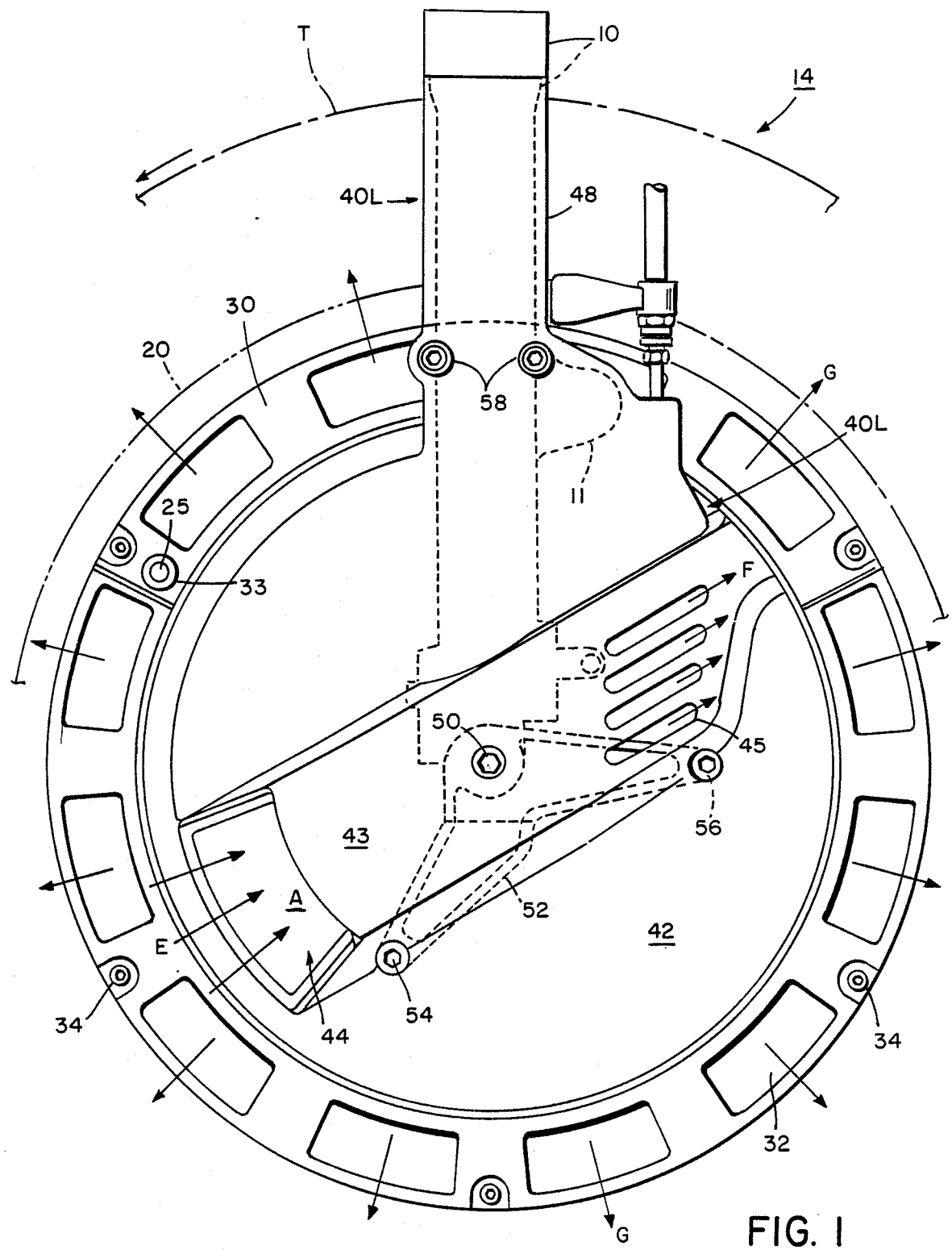
FIG. 1 is a schematic, left-hand side, elevation view of a portion of the front wheel of a motorcyle made in accordance with a preferred embodiment of this invention.
Figure 2:
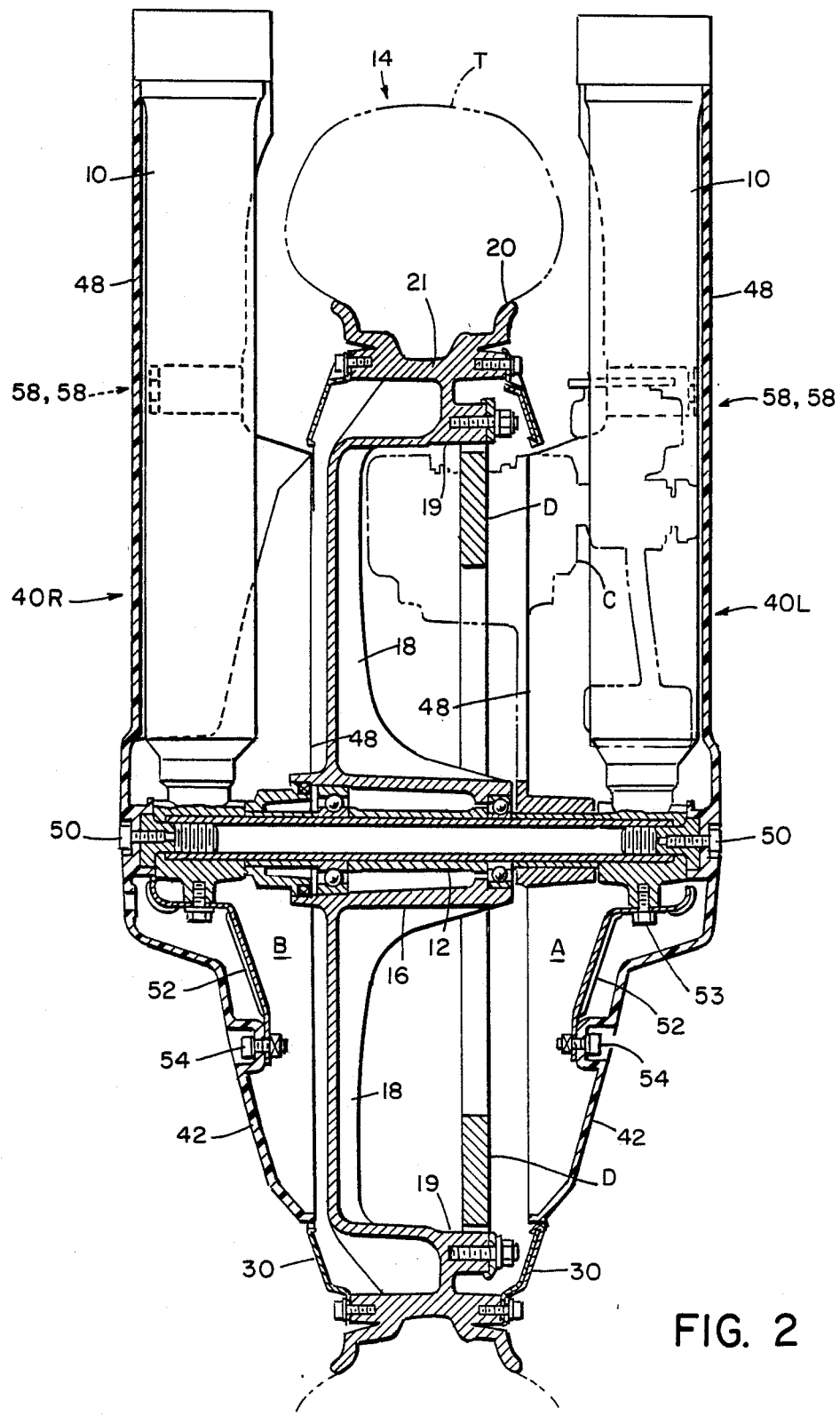
FIG. 2 is a longitudinal sectional view of a detail of FIG. 1, as viewed from in front of the motorcycle.
Figure 3:
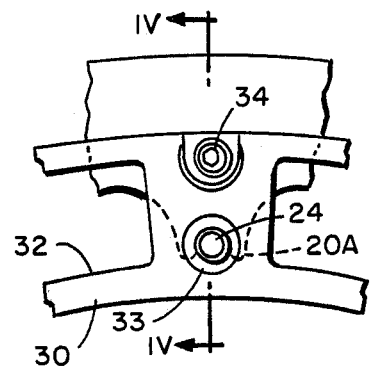
FIG. 3 is a left-hand side view of a detail corresponding to FIG. 1.

FIG. 1 is a schematic left-hand side view showing a front wheel 14 of a motorcycle. FIG. 2 is a longitudinal sectional view of a detail of FIG. 1 as viewed from in front of the motorcycle.

The front wheel 14 is rotatably supported by an axle 12 that is provided in a form for connecting the lower ends of a left and a right bottom case 10, 10 constituting a front fork. Wheel 14 includes a hub 16, a spoke section 18 extending radially from the hub 16, a rim 20 connected to the outer end of this spoke section 18, and a tire T fitted to the rim 20. The hub 18, spoke section 18 and the rim 20 may be formed as an integral casting of light alloy.

A disk brake system is provided in parallel with the front wheel 14. This system includes a rotating disk D and a caliper C equipped with a friction pad. The rotating disk D is secured to a projection 19 with a plurality of threaded holes provided on the spoke section of the front wheel 14. The caliper C is supported by the rotating axle 12 and connected to a projected piece 11 of the bottom case 10 by a connecting member, not shown, so that braking force is transmitted to the bottom case 10.

Figure 4:
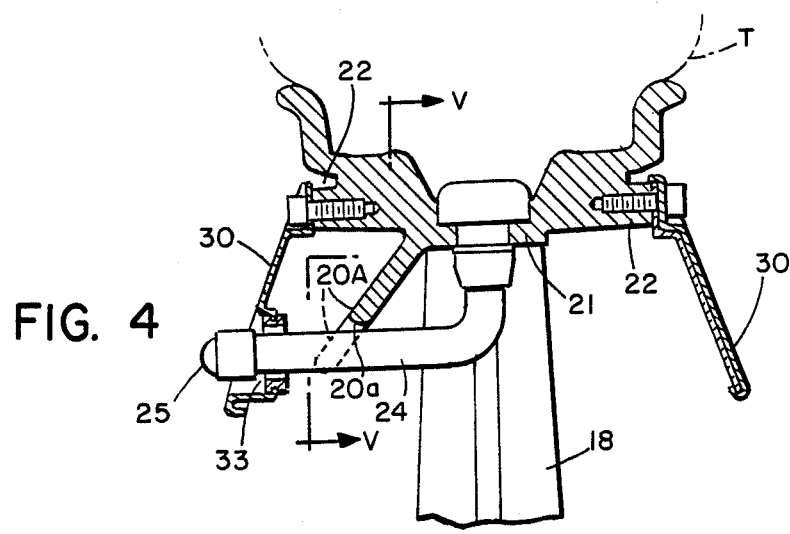
FIG. 4 is a sectional view along line IV—IV of FIG. 3.
Figure 5:
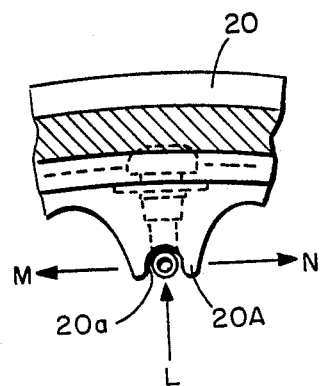
FIG. 5 is an sectional view along line V—V of FIG. 4.

Annular first wheel covers 30, 30, preferably of plastic, are fixed with a plurality of screws 34 to a plurality of projections 22 located at left and right sides of the front wheel 14 and formed on the back wall (wall on the axle 12 side) of the rim 20. The first covers have a plurality of air exhaust ports 32 of approximately rectangular shape formed at equal intervals in the peripheral direction. A filler valve 24 of L shape (extending generally radially inwardly of wall 21 and then generally laterally outwardly) fitted with a cap 25 is provided, as shown in FIG. 4. Valve 24 projects through an opening 33 between a pair of air exhaust ports 32, 32. This filler valve 24 is fitted to the bottom wall 21 of the rim 20 and is located within a cavity or concave seat 20a of a U shaped projection 20A extending toward the axle 12 side from the back wall of the rim 20 and is formed integrally therewith (see FIGS. 3 and 5).

Furthermore, second wheel covers 40L, 40R also preferably of plastic, are provided on housings 10. These second wheel covers, in cooperation with the first covers 30, 30, cover the left and right sides of the front wheel 14 to form inner chambers A, B. The second covers 40L, 40R are fixed to the lower ends of the bottom cases 10, 10 with screws 50, 50 screwed into the ends of the axle 12 and are fixed to both ends of metal supporting pieces 52, 52 of approximately triangular shape fixed to the lower ends of the bottom cases 10, 10 with screws 53, 54, 56. These second covers are also fixed with a pair of screws 58 to a fork pipe cover section 48 that extends upwardly in U shaped (in profile) from a disk shaped main section 42. Sections 42 are located at the sides of the hub 12 and spoke section 18, so as to cover the bottom cases or fork means 10, 10 from outside.

A bulged section 43 of rectangular shape, disposed in a slanting posture rising rearwardly as viewed from a side of the body frame, is formed on the disk shaped main section 42 of the second cover 40L. (This cover 40L covers the rotating disk D and fixed caliper C). The front portion of section 43 is opened to form an air intake port 44 and its rear portion is provided with a plurality of small air exhaust ports 46.

This wheel ventilation embodiment operates as follows: When the vehicle is running, air E enters into the inner chamber A from the air intake port 44 formed on the bulged section 43 of the second cover 40L. This air takes off heat from the rotating disk D and the friction pad of caliper C, which have risen in temperature due to generation of heat during braking, and is exhausted outside from the small air exhaust ports 46 (see arrows F) and is also exhausted outside through the air exhaust ports 32 of the first covers 30 that rotate together with the front wheel 14 (see arrows G).

This ventilation concept is described in my pending U.S. patent application Ser. No. 872,555, filed June 10, 1986, entitled "Wheel Cover for Vehicle" assigned to the assignee of the present application, i.e. Honda Giken Kogyo Kabushikikaisha.

As can be seen from the foregoing, in this the preferred embodiment of this invention the relatively long filler valve 24, that extends in L shape outwardly of the wheel, is installed transversely through the concave seat 20A of the projection 20A. In inflating the tire T, for example, even when forces in the direction of L, M or N (FIG. 5) act on the filler valve 24 by the act of touching the filler valve 24 and connecting an air hose to its filler opening, the filler valve 24 is supported by the adjacent projection 20A and is thus less required to support itself. Moreover, force acting on the first cover 20 through force extended on the filler valve 24 is reduced. this fact means that the filler valve 24 is easy to handle, and the filling operation efficiency is improved.

Furthermore, because the filler valve 24 is accurately located by the projection 20A, when the first cover 30 is fixed to the projection 22 of the rim 20, the opening 3 is fitted over the filler valve 24 properly for more efficient accomplishment of this fixing operation.

Since the wheel cover is constituted with first covers 30 and second covers 40L, 40R, and one first cover 30 is fitted to the back wall of the rim 20 to completely cover the hub 16 and spoke section 18 of the front wheel and the rotating disk D, it is possible to effectively prevent the disk brake system from contamination and influence of rain-water. In addition, because of providing an air intake port 44, small air exhaust ports 46 and air exhaust ports 32, it is possible to effectively take off generated heat as a result of braking.

And, by fitting the first covers 30 to the back wall of the rim 20, sufficiently separated from the center of the axle, it is possible to maximize the wheel cover in diameter and to form a multiplicity of air exhaust ports 32 in the peripheral, i.e. circumferential, direction, enabling improved cooling efficiency for the disk brake system.

As is clear from the foregoing description, in the present invention, because of forming a protective projection integrally with the rim bottom wall, this projection being located adjacent to opposite circumferential sides of a filler valve fitted to the rim bottom wall and extending in a bent or "L" shape toward a side of the wheel, when a filling operation, for example, is performed external force acting on the filler valve is resisted by the protective projection. Moreover the stress burden required to be borne by the filler valve itself is small, and in assembling a wheel, it is possible to assemble a filler valve quickly by locating a protective projection for improved working efficiency.

Those familiar with the present disclosure and skilled in the art to which this invention pertains may well recognize additions, deletions, substitutions, equivalents, or other modifications which would fall within the purview of the invention which is deemed to be set forth in the appended claims.

What is claimed is:

1. A vehicle wheel comprising:
   wheel rim means having
      bottom wall means;
   a filling valve; and
   a protective projection means formed integrally with bottom wall means of said rim means;
   said protective projection means being located adjacent to opposite sides, in the circumferential direction, of said filling valve; and
   said filling valve being fitted to said rim bottom wall means and extending generally radially inwardly and then generally laterally of said bottom wall means and outwardly of said wheel rim means with said filling valve providing a filling extremity spaced radially inwardly from said bottom wall means and disposed spatially displaced from said wheel rim means; and
   said protective projection means projecting from said bottom wall means radially inwardly and axially outwardly of said bottom wall means to provide protection on opposite sides of said filling valve at a location spartially displaced from said wheel rim means;

wheel cover means mounted at least in part on said rim means and including a plurality of circumferentially spaced, wheel exhaust ports; and said protective projection means comprising generally U-shaped projection means projecting from said rim means and formed integrally therewith and providing bifurcated extremity means defining a concave support seat transversely receiving a portion of said filling valve;

said seat being disposed circumferentially between a pair of circumferentially spaced, wheel exhaust ports, and said seat defining a filling location for said wheel relative to said wheel and cover means thereof.

* * * * *